United States Patent

[11] 3,583,355

[72] Inventor Bennie L. Smith
1013 Court St., Muskogee, Okla. 74401
[21] Appl. No. 840,385
[22] Filed July 9, 1969
[45] Patented June 8, 1971

[54] QUICK RELEASE CLAMP FOR SKI ROPE
10 Claims, 5 Drawing Figs.
[52] U.S. Cl. .................................................. 114/235, 24/134
[51] Int. Cl. .................................................. B63b 25/00
[50] Field of Search ...................................... 114/235, 235.1, 230; 24/132, 132 WL, 134 KD, 134 KB, 134 K, 134 L, 249 LL, 134

[56] References Cited
UNITED STATES PATENTS
| | | | |
|---|---|---|---|
| 2,330,736 | 9/1943 | Paulson ........................ | 24/132 |
| 3,205,545 | 9/1965 | Ring ............................. | 114/235X |

*Primary Examiner*—Trygve M. Blix
*Attorney*—Dunlap, Laney, Hessin & Dougherty

ABSTRACT: A clamp which includes a mounting bracket having a stationary jaw thereon positioned for clamping cooperation with a movable jaw pivotally supported on the mounting bracket. The movable jaw is also pivotally connected to one end of an actuating lever. A cam link has one end pivotally connected to the mounting bracket and a second end connected to the actuating lever at a point between its ends. The several points of pivotal connection and the length of the cam link are such that the point of pivotal connection of the cam link to the actuating lever passes through a line between the point of pivotal connection of the lever to the movable jaw and the point of pivotal connection of the link to the bracket at such time as the movable jaw is moved from an open to a closed position by movement of the actuating lever. The bracket is adapted for securement to the transom or gunwale of a boat so that a towrope used in water skiing can be clamped between the jaws for towing purposes and quickly released therefrom when desired.

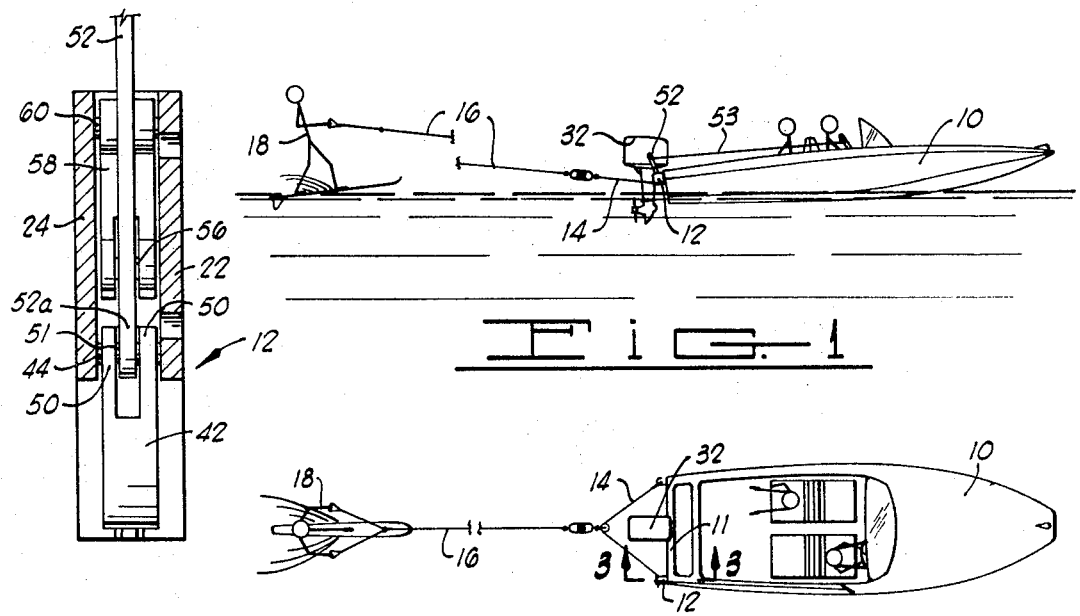
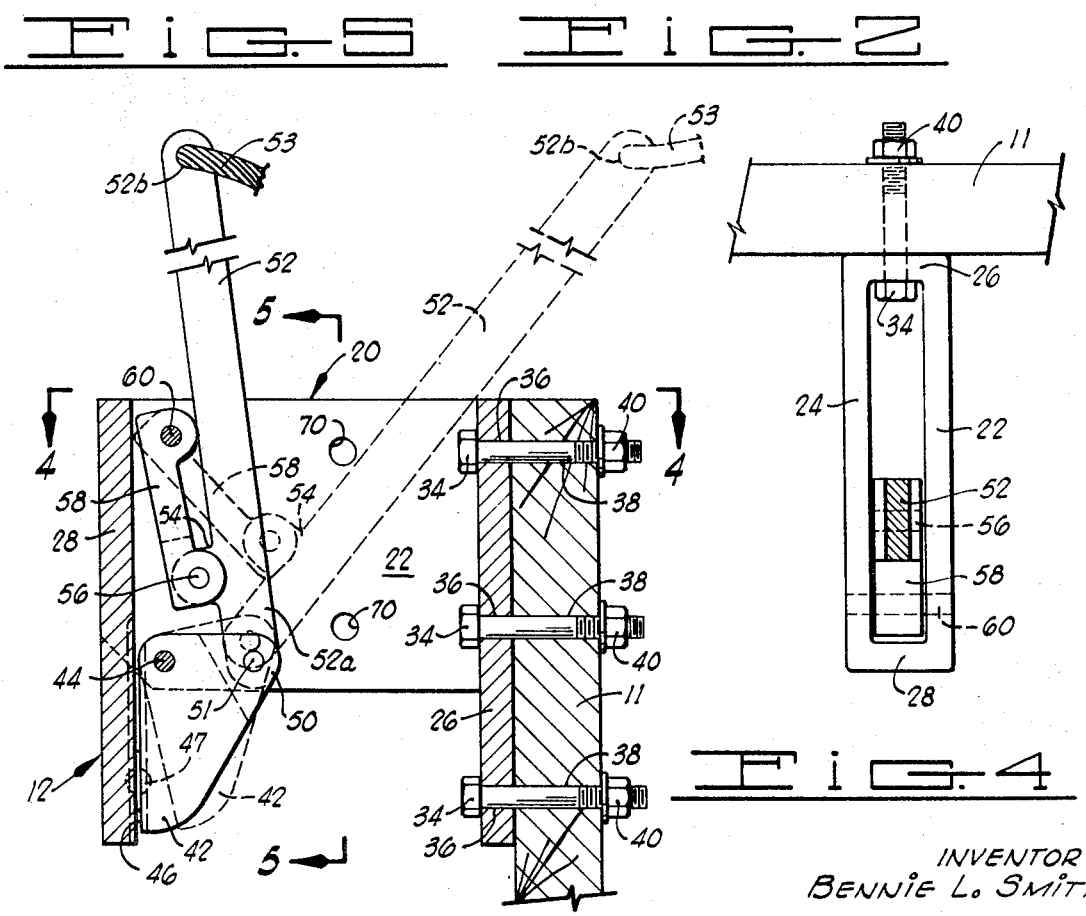

QUICK RELEASE CLAMP FOR SKI ROPE

BACKGROUND OF THE INVENTION

1. Field of the Invention

This invention relates to manually operated, quick release devices for clamping a flexible line subject to quick release of the line. More specifically, but not by way of limitation, the present invention relates to quick release, boat-mountable clamps useful for firmly clamping one end of a flexible member, such as a rope, and for quickly and easily releasing such flexible member upon manual actuation.

2. Brief Description of the Prior Art

Water skiing has been a rapidly growing sport for the past several years. With the growth of the sport, the equipment utilized in its practice has been improved in various respects. Despite the improvement in equipment, the promulgation of certain rules for operation of boats used in towing water skiers, and certain precautions which are taken for enhancing the safety of this aquatic sport, accidents still sometimes occur as a result of the skier becoming entangled in a towrope which is trailed from the towing boat at the time after the skier has fallen in the water and no longer grasps a handle at one end of the rope in his hands. This has resulted in broken bones and other injuries. The danger of this type of accident occurring is particularly pronounced where a plurality of skiers are being towed behind a single boat.

One recent proposal for avoiding this type of accident has been that of using a quick release clamp or coupling for attaching the leading end of the water ski towrope to the power-operated boat used in towing. This quick release rope coupling is that which is described in U.S. Pat. No. 3,205,545 issued Sept. 14, 1965. In the use of the ring rope coupling of this device, a water ski towrope is provided with a loop in its end adjacent the towing boat, and this loop is passed over a hook-shaped element which cooperates with a pair of stationary lips to retain the loop over the hook. When a lever or arm is tripped, the hook element can pivot in a way which releases the loop at the end of the towrope, thus preventing a skier who may have become entangled in the towrope from being dragged behind the boat.

BRIEF DESCRIPTION of THE PRESENT INVENTION

The present invention provides a quick release clamp for releasably securing to a towing vehicle, a ski rope used in towing a water skier. The quick release clamp of the invention includes a mounting bracket which is adapted for securement to the boat—preferably on the transom of the boat, but also on the gunwale if this should be desirable. The mounting bracket has secured thereto, or formed integrally therewith, a stationary clamping jaw. Pivotally mounted on the mounting bracket is a movable jaw which can be moved into a position of cooperation with the stationary jaw to securely clamp an end or bight portion of a towrope therebetween. At a point spaced from its point of pivotal connection to the mounting bracket, the movable jaw is also pivotally connected to one end of an elongated actuating lever which is used for manually setting (clamping) or releasing the quick release clamp. A two-ended cam link has one of its ends pivotally connected to the mounting bracket, and a second end connected to the actuating lever at a point between its ends.

The lever and cam action is what is sometimes referred to as an overcenter action in which the point of pivotal connection of the cam link to the lever arm moves through an arc during the pivotation of the lever arm from an open to a closed position, and in moving through such arc, crosses from one side of a line connecting the point of pivotal connection of the lever arm to the movable jaw to the point of pivotal connection of the cam link to the mounting bracket. By reason of this overcenter action, the movable jaw, when moved into contact with the stationary jaw by a clamping movement of the actuating lever, cannot then be released by a force acting between the jaws and tending to open them. Rather, the actuating lever must itself be pivoted in order to open the jaws, and thus release the end of the towrope or other flexible member secured therebetween. Opening of the jaws in this manner is, however, easily effected, and can be accomplished manually either by personnel in the towing boat or by the skier through the intervening instrumentality of an elongated release rope or cable which the skier can pull to pivot the actuating lever.

It is an important and major object of the invention to provide a quick release clamp for a water ski towrope which can clamp the free, unlooped end of a ski rope bridle in a secure manner and allow the bridle to be quickly released when the release clamp is manually actuated.

An additional object of the invention is to provide a very simple, yet effective quick release clamp which can be operated either from the towing boat, or by a water skier, for quickly releasing the end of the towrope which is secured to the boat and used to tow the water skier.

A further object of the invention is to provide a clamp for detachably and releasably clamping one end of a rope for towing a water skier by boat, which clamp has a minimum number of moving parts and is reliable in use and characterized in having a long and trouble-free service life.

A further object of the invention is to provide a quick release clamp for a water ski towrope which is relatively inexpensive to manufacture.

Another object of the invention is to provide a quick release clamp for securing one end of a water ski towrope to a boat, which clamp is of relatively light weight and can be quickly and easily secured to either the transom or the gunwale of the boat by a single person.

A further object of the invention is to provide a quick release clamp for securing one end of a flexible member for the purpose of towing water skiers, aqua plane riders or other waterborne persons.

Additional objects and advantages of the invention will become apparent from the following detailed description of the invention when considered conjunctively with the accompanying drawings.

BRIEF DESCRIPTION OF THE DRAWINGS

FIG. 1 is a side elevation view of the quick release clamp for a water ski towrope as it appears in use for towing a water skier behind a boat.

FIG. 2 is a plan view of the towrope, quick release clamp and boat shown in FIG. 1.

FIG. 3 is a sectional view taken along line 3–3 of FIG. 2.

FIG. 4 is a sectional view taken along line 4–4 of FIG. 3.

FIG. 5 is a sectional view taken along line 5—5 of FIG. 3.

DETAILED DESCRIPTION OF A PREFERRED EMBODIMENT OF THE INVENTION

Referring initially to FIG. 1 of the drawing, shown therein is a boat 10 in use for towing a water skier. Secured to the transom 11 of the boat 10 is the quick release clamp of the present invention as designated generally by reference numeral 12. The clamp 12 is shown securing one end of a rope 14 which forms a bridle. The bridle 14 is passed through a pulley which is secured to one end of a towrope 16 used to tow a water skier 18 in conventional fashion.

The quick release clamp 12 of the invention is illustrated in greater detail in FIG. 3. As here shown, the clamp 12 includes a mounting bracket designated generally by reference numeral 20. In the illustrated embodiment of the invention, the mounting bracket 20 is preferably formed as an integral member by casting or other suitable means, and includes a pair of opposed, substantially parallel sidewalls 22 and 24 (see FIG. 4), and a pair of opposed, substantially parallel end walls 26 and 28. The mounting bracket 20 does not have a top wall and a bottom wall so that an open passageway is formed through the bracket between the sidewalls 22 and 24. The bracket 20 is secured to the transom 11 of the boat 10 to one side of an outboard motor 32 by means of a plurality of bolts 34 which are extended through holes 36 formed through the end wall 26 and aligned with holes 38 formed through the transom. The bolts 34 are secured tightly in position by means of suitable nuts 40 threaded on the ends of the bolts on the inner side of the transom 11. It will be noted that the end wall 26 is of substantially greater length than the vertical widths of the sidewalls 22 and 24 (sidewall 24 having dimensions equivalent to the wall 22 shown in FIG. 3). This permits the clamp 20 to be more easily mounted on the transom 11 of the boat 10, and to have greater supporting area and strength when so mounted, and also facilitates the extension of the towrope between certain jaws of the clamp as hereinafter explained.

Mounted within the space between the sidewalls 22 and 24 is the moving mechanism of the quick release clamp. This mechanism includes a movable jaw 42 which is pivotally secured between the sidewalls 22 and 24 at a location adjacent the lower end of the end wall 28. The lower portion of the end wall 28 projects below the sidewalls 22 and 24 to form a stationary jaw. The movable jaw 42 is pivotally secured in the mounting bracket 20 by means of a pivot pin 44 which is pressed through holes in the sidewalls 22 and 24 which are aligned, and in registry, with a mating hole formed in one corner of the movable jaw. The movable jaw 42 is of generally triangular configuration in the illustrated embodiment of the invention, and has a clamping surface 46 which extends adjacent the lower portion of the end wall 28 and, when the movable jaw 42 is fully closed, will contact the adjacent surface of the wall 28. Preferably, both the surface of the wall 28 which faces the movable jaw 42, and the clamping surface 46 of the movable jaw 42 which faces the end wall 28 have elongated, parallel serrations or grooves formed therein to aid in the clamping action afforded when the jaws cooperate to grip a flexible member, such as a water ski towrope. (Such a flexible member is illustrated in dashed lines in FIG. 3 and is designated by reference numeral 47).

Spaced from the pivot pin 44 toward the transom 11 in the jaw 42 are other pivot pin apertures formed through ears 50 located at a bifurcated corner portion of the jaw 42, which apertures receive a pivot pin 51 used to interconnect the movable jaw with one end 52a of an elongated actuating lever 52 which is extended between the ears. At its other end, the actuating lever 52 has an aperture 52b formed therethrough to permit a release rope or cable 53 to be secured to this end of the actuating lever. Spaced along the actuating lever 52 from the end portion 52a is a laterally projecting cam link lug 54. The cam link lug 54 is apertured or bored to receive a pivot pin 56. The pivot pin 56 extends through a pair of aligned apertures formed in a bifurcated end portion of a cam link 58 which has its bifurcated end portion thus pivotally connected to the actuating lever 52. At its end opposite the end connected to the actuating lever 52 through the cam link lug 54, the cam link is pivotally connected to the bracket 20 by means of a pivot pin 60 extending through apertures formed in the walls 22 and 24 of the bracket in alignment with an aperture formed through the cam link 58. Thus, the cam link 58 is able to pivot within the bracket 20 from the full-line position illustrated in FIG. 3 to the dashed-line position shown in the same figure. The dashed-line positions of the movable jaw 42, actuating lever 52 and cam link 58 as illustrated in FIG. 3 depict the status of the clamping mechanism at a time when it has been moved to the release position.

OPERATION

In utilizing the quick release clamp 12 of the invention, the clamp is secured to a boat 10 used for towing the water skier by bolting the mounting bracket 20 either directly to the boat as shown in the accompanying drawings, or to an intermediate bracket or supporting member which is itself secured to a bolt. Although it is usually preferable to bolt the mounting bracket 20 to the transom of the boat and to one side of an outboard motor, where one is utilized, the mounting bracket may also be bolted to a gunwale of the boat if this should be desired. It is possible to bolt the mounting bracket to the boat by extending the bolts through the holes 36 formed in the end wall 26 or by extending the bolts through holes 70 formed in the sidewall 22. The mounting bracket 20 should, of course, be secured to the boat 10 in a location such that the actuating lever 52 projects upwardly and has its upper end portion disposed in an accessible location where the actuating lever is free to undergo pivotation through an arc of substantial size.

In the usual method of connecting a water ski towrope to the towing boat 10, a bridle 14 is provided which has opposite end portions secured to the opposite sides of the transom 11 to thus form a loop or bight portion aft of the boat. A pulley is then permitted to ride along this bight portion, and is connected through a suitable swivel to an elongated rope 16 having a handle at its opposite end for gripping by the water skier. There will also usually be provided some type of flotation structure adjacent the point of connection of the elongated rearwardly extending line to the bridle so that the ski towrope will not sink when it is released by the skier or from the boat.

In the illustrated use of the present invention, the quick release clamp 12 is mounted at the starboard end of the transom 11 so that the clamp is in a position to receive and engage one end of the bridle 14. After the mounting bracket 20 has been bolted to the transom in this manner, a release cable 53 is passed through the hole or aperture in the upper end of the actuating lever 52 and is extended forwardly in the boat 10 so that it is within easy reach of the operator of the boat or other persons within the boat. The actuating lever 52 is pivoted toward the bow of the boat to pivot the movable jaw 42 from the full-line position to the dashed-line position shown in FIG. 3. This provides an opening or space between the movable jaw 42 and the stationary jaw formed by the lower end portion of the end wall 28. The free end of the bridle 14 can then be passed between the jaws preparatory to clamping it in position. With the free end of the bridle 14 in place, the upper end portion of the actuating lever 52 is pivoted toward the stern of the boat 10. This pivotation of the actuating lever 52 produces the overcenter action of the cam link 58 hereinbefore described and brings the movable jaw 42 into juxtaposition to the lower end portion of the end wall 28. Thus, the free end of the bridle 14 is clamped securely in position and cannot be released by tension applied to the bridle. Towing can now be commenced.

If, during the course of water skiing, the skier 18 loses his balance or, for some reason, falls into the water, the usual practice is for the skier at that time to release the handle on the towrope 16 to disconnect himself from the towing boat 10. On some occasions, however, particularly where there are multiple skiers, it is possible for the skier to become entangled in the towrope, and to be dragged through the water at high speed by the boat 10. This is a particularly dangerous situation, and can result in broken arms or legs or other bodily injury. To the end of preventing the occurrence of injuries of this type, the present invention is provided.

Let it be assumed that the skier 18 has fallen into the water and has become entangled in the towrope 16. At this time, personnel in the towing boat 10 who are observing the skier can quickly pull the release cable 53. As the release cable 53 is pulled toward the forward end of the boat 10, the movable jaw 42 is pivoted from its closed position, as illustrated in full lines in FIG. 3, to its open position illustrated in dashed lines in the same figure. This will release the free end of the bridle 14 permitting the bridle to run through the pulley by which it is secured to the towrope 16. The towrope 16 is thus quickly freed from the bridle to release the entangled skier 18 from the boat 10. Accidents and injuries are thus avoided.

It should be pointed out that, as an alternative to operation of the present invention in the manner described, the release cable 53 may be passed around a sheave or pulley secured forward of the quick release clamp 12 on the boat 10 and then extended back to the skier. In this way, the skier may himself control the release of the free end of the bridle 14 and, if he becomes endangered by entanglement in the ski rope 16, he can release himself from the boat 10 by pulling upon the release cable 53.

It should be pointed out that although a preferred embodiment of the invention has been illustrated in the drawings and described herein, various modifications and changes in the described structure can be effected without departure from the basic principles of the invention. All changes and innovations of this type are therefore deemed to be circumscribed by the spirit and scope of the invention.

What I claim is:

1. A quick release clamp for a water ski towrope comprising:
   a mounting bracket for mounting the clamp on a boat;
   a stationary jaw secured to the mounting bracket;
   a movable jaw pivotally mounted on the mounting bracket adjacent said stationary jaw and cooperating with said stationary jaw for clamping a flexible, elongated member therebetween;
   an elongated actuating lever pivotally connected at one of its ends to said movable jaw; and
   a cam link having a first end pivotally connected to said actuating lever intermediate the ends thereof, and having a second end pivotally connected to said mounting bracket, said cam link, actuating lever, movable jaw and mounting bracket being interconnected to cause the point of pivotal connection of the cam link to the lever arm to move through an arc crossing a line between the point of pivotal connection of the lever arm to the movable jaw, and the point of pivotal connection of the cam link to the mounting bracket at such time as the actuating lever is pivoted.

2. A quick release clamp as defined in claim 1 wherein said mounting bracket and stationary jaw are integrally formed as a single unitary element.

3. A quick release clamp as defined in claim 1 wherein said movable jaw is bifurcated and receives said one end of said elongated actuating lever in said bifurcation.

4. A quick release clamp as defined in claim 1 wherein said cam link is bifurcated at said first end and receives said actuating lever in said bifurcation.

5. A quick release clamp as defined in claim 1 wherein said mounting bracket comprises:
   a pair of substantially parallel sidewalls; and
   a pair of substantially parallel end walls extending between the end edges of said parallel sidewalls, said movable jaw and cam link being pivotally secured between said sidewalls.

6. A quick release clamp as defined in claim 2 wherein said mounting bracket is a unitary casting and includes;
   a pair of substantially parallel sidewalls; and
   a pair of substantially parallel end walls extending between the end edges of said parallel sidewalls, said movable jaw and cam link being pivotally secured between said sidewalls.

7. A quick release clamp as defined in claim 6 and further characterized as including a release cable secured to the end of said actuating lever opposite its end which is pivotally connected to said movable jaw.

8. A system for towing water skiers comprising:
   a towing boat having a transom at the stern thereof;
   a mounting bracket including two substantially parallel sidewalls, and two substantially parallel end walls secured between the sidewalls, one of said end walls being secured to the transom of said towing boat, and the other of said end walls forming a stationary jaw;
   a movable jaw pivotally mounted between said sidewalls and closable against said stationary jaw;
   an elongated actuating lever having a first end portion projecting upwardly from said mounting bracket, and having a second end portion pivotally connected to said movable jaw at a point spaced from the pivotal axis of the movable jaw on the mounting bracket;
   a cam link having one end portion pivotally connected between the sidewalls of said mounting bracket for pivotation about an axis spaced from the pivotal axis of said movable jaw, and having a second end portion pivotally connected to said actuating lever;
   a bridle having one end secured to one side of the transom of said boat and the other end clamped between said stationary jaw and said movable jaw; and
   a towrope secured to a bight portion of said bridle.

9. A system for towing water skiers as defined in claim 8 wherein said mounting bracket is an integrally formed, one-piece casting.

10. A system for towing water skiers as defined in claim 8 wherein said cam link is dimensioned and connected to said actuating lever so that the pivotal axis of said actuating lever on said cam link moves across a line between the pivotal axis of the actuating lever on said movable jaw and the pivotal axis of said cam link on said mounting bracket when said actuating arm is pivoted.